Feb. 24, 1959 E. D. HIGHTOWER 2,875,285

DETECTOR FOR TELEPHONE SURREPTITIOUS LISTENING TECHNIQUES

Filed April 30, 1957

INVENTOR.

BY Earle D. Hightower

Roland A. Anderson

ATTORNEY

United States Patent Office 2,875,285
Patented Feb. 24, 1959

2,875,285

DETECTOR FOR TELEPHONE SURREPTITIOUS LISTENING TECHNIQUES

Earle D. Hightower, Kensington, Md., assignor to the United States of America as represented by the United States Atomic Energy Commission Application April 30, 1957, Serial No. 656,164

4 Claims. (Cl. 179—175)

The present invention relates to telephone countermeasures, and more especially to apparatus for attaching to a telephone to detect any attempt to wire-tap using the telephone microphone as a source of voice modulation.

The telephone microphone is normally connected across the two incoming telephone lines through a disconnect switch which is opened by replacing the telephone handset on the telephone hook. Techniques have been developed for surreptitiously energizing the microphone while the handset is in place and listening to the conversations occurring in the vicinity of the telephone. In one of these techniques, for example, the disconnect switch is by-passed to energize the microphone and an audio amplifier with a speaker or head phones is connected across the telephone line at a remote point, enabling a remote listener to hear the conversation by detection of the modulation of the current in the telephone line.

It is an object of this invention to provide means for detecting any such listening technique which energizes the telephone microphone. Another object of this invention is to provide for visual or aural warning when the telephone microphone is energized while the handset is in place, but which will not affect normal telephone usage when the handset is removed from its cradle. Yet another object is to provide a compact, long-lived telephone attachment for detection of a wire-tap.

These and other objects of the invention are accomplished by constantly monitoring the voltage across the microphone and current through it, in a manner which will be better understood from the following detailed description of a preferred embodiment thereof, when read in connection with the appended drawings, wherein.

Figures 1, 2:
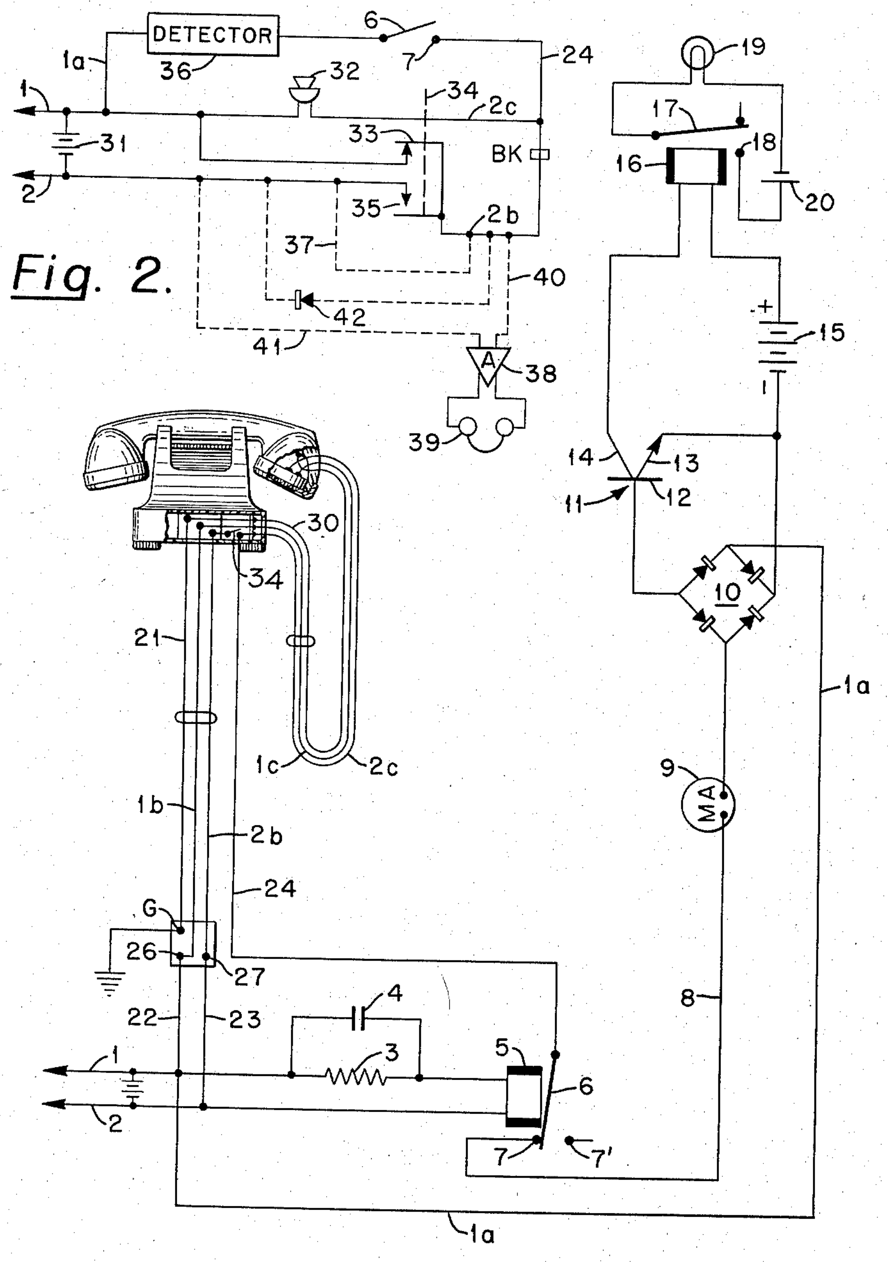
Fig. 1 is a schematic diagram of the preferred form of the detector.
Fig. 2 is a simplified diagram of the normal telephone microphone, the disconnect switch, switch by-passes, and the novel detector.

Referring now to Fig. 1, the incoming telephone lines 1, 2, connect the central telephone office with the terminal box located near the telepehone of a user. Terminals 26, 27 are connected to the telephone through wires 1*b*, 2*b*, while grounded terminal G is connected to the telephone through wire 21. The transformer in the telephone is connected to one side of the microphone in the handset by wire 1*c*. Wire 2*c* connects the dialing mechanism and the disconnect switch in the telephone with one side of the microphone in the handset. My novel telephone attachment includes relay 5 which is connected across lines 1, 2 through a series resistor 3 which limits the amount of current drawn thereby. The resistor may be 80,000 ohms, ½ watt, while the relay may be of a commercial type such as Sigma 5F-coil 8,000 ss. A .01 microfarad condenser may be connected across resistor 3, but is not required. The relay is provided with a simple armature which alternately opens or closes contacts 6, 7. Contact 6 is connected through lead 24 to the slate/black wire connection marked "BK" on the rear of the dial of the telephone, and from "BK" through wire 2*c* to the microphone.

The detector may include a milliammeter 9 connected to contact 7 through lead 8 and full-wave bridge rectifier 10 including four 1N34A germanium diodes, which serve to provide a fixed polarity input to a following transistor amplifier, regardless of the polarity of the signal on leads 8, 1*a*. Lead 1*a* connects one terminal of the bridge to telephone line 1 through terminal 26. The output of the bridge is impressed upon the inputs to a transistor 11 utilized as an amplifier. Base 12 and emitter 13 are connected across the bridge, while collector 14 is connected to one side of relay 16, and through the relay to a source of potential 15. The source may be a D. C. power supply for the detector and is preferably a parallel arrangement of two 22.5 volt batteries. A type CK721 transistor has been used successfully. It is also obvious that a suitable electron tube or magnetic type amplifier could be utilized in place of the transistor, which is preferred for long life and small size, however. Relay 16 is provided with an armature 17 which is connected through lamp 19 and potential source 20 to contact 18. When the relay is energized, armature 17 is picked up against contact 18, energizing lamp 19. The lamp is preferably a 1½ volt type. Supply 20 is preferably two 1.5 volt batteries connected in parallel to provide extended life.

Referring now to Fig. 2, a simplified wiring diagram of one common type of telephone circuit includes input leads 1, 2 between which is connected a 45 volt D. C. source 31. From lead 1 direct connection is made to one side of the microphone 32 and from the other side of the microphone to a contact BK, which is associated with the dialing mechanism. From BK connection is made to contacts 33 of a disconnect switch and thence back to lead 1. The contacts 33 are closed when the handset is on the hook 34, while contacts 35 are open. Removing the handset from the hook 34 allows the switch arm to rise, closing contacts 35 and opening contacts 33, connecting BK to lead 2 and energizing the microphone. Contacts 6, 7 and detector 36 are connected through leads 24 and 1*a* between BK and lead 1 in parallel with the microphone.

Three of several surreptitious listening techniques are illustrated. For example, the switch 34 may simply be by-passed, as by conductive paint lead 37, energizing microphone 32 even while the handset is on the hook. The by-pass may include an audio amplifier 38 provided with headphones 39 or a speaker, with a fourth wire 40 being connected to BK and brought out through the input cable to the telephone and connected to one amplifier input, while a second wire 41 is attached to line 2 and the other amplifier input. A third by-pass technique involving connecting a diode 42 between BK and lead 2 will energize the microphone so that by tapping lines 1 and 2 conversations near the microphone may be heard.

In operation of the detector, if by some of the above means the microphone is energized so that it will serve as a pick-up, an electrical potential will appear thereacross and a current will flow through the microphone. That potential causes a current to flow in the circuit including meter 9 to provide a first warning to the telephone user. A second or an alternate warning may be provided by the lamp 19. The normal 45 volts across leads 1, 2 will activate the relay 5, closing contacts 6, 7 and feeding the input signal on lead 24 to transistor amplifier 11. The amplifier will then supply sufficient current to activate relay 16, closing contact 18, and energizing lamp 19. A current of 20 microamperes flowing through the input circuit to the transistor will energize relay 16, for example, when the relays are adjusted to pull in at .42 milliampere and drop out at .32 milliampere and the transistor supplies a current gain of about 50. The battery 15 in series with the emitter brings relay 16 to near the critical point so that the small signal will cause it to close.

In order to prevent activation of the relay 16 while the telephone is in normal use, at which time current flows through the microphone, the disconnect relay 5 is utilized. It is held in a normally closed position by the 48 volts normally found between lines 1, and 2, the main telephone lines. When the telephone handset is lifted from its cradle, the voltage between lines 1 and 2 is decreased, allowing the disconnect relay to open, opening contacts 6, 7, and thus disconnecting the detection device from the circuit to prevent interference with normal telephone service.

It will be appreciated that I have provided a novel device which will furnish warning to a telephone user of an attempt to listen surreptitiously to sounds occurring near a telephone microphone. The device is simple to build, inexpensive, easy to install, and does not interfere with normal telephone service.

I claim:

1. A detector for a wire-tap device which energizes a telephone microphone connected to one of the two incoming telephone lines by by-passing the telephone hook-actuated disconnect switch connected between said microphone and the other telephone line, comprising: means to continuously monitor said microphone for an electrical potential thereacross only when said disconnect switch is actuated, and means to provide a warning signal responsive to said potential.

2. A detector for a wire-tap device which energizes a telephone microphone connected to one of the two incoming telephone lines by by-passing the telephone hook-actuated disconnect switch connected between said microphone and the other telephone line, comprising: signal means to provide a warning responsive to an electrical potential of at least a selected magnitude connected to one side of said microphone, a second switch connected between said means and the other side of said microphone, and means to open or close said second switch responsive respectively to a decrease or increase, in the voltage across said telephone lines to disconnect said signal means during normal usage of said telephone.

3. A detector for a wire-tap device which energizes a telephone microphone connected to one of the two incoming telephone lines by by-passing the telephone hook-actuated disconnect switch connected between said microphone and the other telephone line, comprising: a relay connected across said lines and provided with a first contact and with a second contact connected to said microphone, said relay closing and opening said contacts responsive, respectively, to opening and closing of said disconnect switch, a rectifier bridge connected between one of said contacts and said one line, an amplifier having its input connected across said rectifier bridge and provided with an output, and means connected to said output to indicate a change in current flow in said output as an indication of a wire-tap.

4. A detector for a wire-tap device which energizes a telephone microphone connected to one of the two incoming telephone lines by by-passing the telephone hook-actuated disconnect switch connected between said microphone and the other telephone line, comprising: a first relay connected across said lines and provided with first and second contacts, said contacts being closed when said relay is energized by the normal voltage across said lines and open when said voltage is decreased by closing said disconnect switch, means connecting said first contact to one side of said microphone, and a detector unit comprising an amplifier having a first input lead connected to said second contact, a second input lead connected to said one telephone line, and an output, a second relay and a source of bias current connected in series with said amplifier output to bias said second relay to a selected point below its pick-up current, said point being so selected that a signal of a selected magnitude at said amplifier input will cause said second relay to pick-up, and warning signal means actuated by pick-up of said second relay.

References Cited in the file of this patent

UNITED STATES PATENTS

| | | |
|---|---|---|
| 1,864,646 | Edwards | June 28, 1932 |
| 2,228,673 | Reeves | Jan. 14, 1941 |
| 2,756,288 | White | July 24, 1956 |

FOREIGN PATENTS

| | | |
|---|---|---|
| 491,612 | Great Britain | Sept. 6, 1938 |